(12) United States Patent
Thompson

(10) Patent No.: US 8,651,454 B1
(45) Date of Patent: Feb. 18, 2014

(54) EFFICIENT DRAIN SYSTEMS

(76) Inventor: Paul Thompson, Cedar Crest, NM (US)

( * ) Notice: Subject to any disclaimer, the term of this patent is extended or adjusted under 35 U.S.C. 154(b) by 121 days.

(21) Appl. No.: 13/420,902

(22) Filed: Mar. 15, 2012

Related U.S. Application Data

(60) Provisional application No. 61/472,281, filed on Apr. 6, 2011.

(51) Int. Cl.
*F16K 51/00* (2006.01)

(52) U.S. Cl.
USPC .......................... 251/144; 251/145; 222/567

(58) Field of Classification Search
USPC .......... 251/144, 145, 146, 155; 220/601, 661, 220/676; 222/568, 569, 567, 570, 573; 137/376, 360, 317, 320, 585
See application file for complete search history.

(56) References Cited

U.S. PATENT DOCUMENTS

| | | | | |
|---|---|---|---|---|
| 2,634,745 A * | 4/1953 | Cornelius | ...................... | 137/334 |
| 3,142,415 A * | 7/1964 | Louchheim | ...................... | 221/96 |
| 3,195,566 A * | 7/1965 | Cornelius | .................. | 137/454.2 |
| 3,587,637 A * | 6/1971 | Coleman | ...................... | 137/577.5 |
| 3,730,224 A * | 5/1973 | Prisk | ........................ | 137/625.33 |
| 4,247,134 A * | 1/1981 | Yergen | ............................ | 285/38 |
| 4,944,248 A * | 7/1990 | Torng | ............................. | 119/264 |
| 5,129,684 A | 7/1992 | Lawrence et al. | | |
| 5,439,256 A | 8/1995 | Brainard | | |
| 5,911,402 A * | 6/1999 | Lavoie | ......................... | 251/144 |
| 6,065,491 A * | 5/2000 | Rider | ............................ | 137/360 |
| 6,145,808 A * | 11/2000 | Hickman | ...................... | 251/144 |
| 6,681,796 B2 | 1/2004 | King, Jr. | | |
| 7,552,742 B2 | 6/2009 | Dole | | |
| 7,597,361 B2 | 10/2009 | Theilen | | |
| 8,191,569 B2 * | 6/2012 | Moore | ........................... | 137/360 |
| 2004/0265091 A1 | 12/2004 | Cheung | | |

* cited by examiner

*Primary Examiner* — John Bastianelli
*Assistant Examiner* — Andrew J Rost
(74) *Attorney, Agent, or Firm* — RG Patent Consulting, LLC; Rachel Gilboy

(57) ABSTRACT

The valve assembly allowing users to efficiently drain large containers, such as tanks, barrels, drums, and pipes which are used to hold fluids. This device features a draining pipe with an attached dispensing valve, which can be installed into a hole that is drilled into the desired container. After installation, consumers may simply turn the dispensing valve to release desired amounts of liquid. Using this product may eliminate the need for using pumps, or for welding or cutting tees into pipes, in order to effectively drain large containers. The device may be for use in residential homes, farms, and industrial establishments.

19 Claims, 5 Drawing Sheets

EFFICIENT DRAIN SYSTEMS

CROSS-REFERENCE TO RELATED APPLICATION

The present application is related to and claims priority from prior provisional application Ser. No. 61/472,281, filed Apr. 6, 2011 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of draining means and more specifically relates to efficient drain systems for use with substantially contained volumes of fluids.

2. Description of the Related Art

Storage of liquids, solids and gases (fluids) may be provided by large containers. Fluids may be transported between locations via piping infrastructure or by large moveable containers such as those pulled by highway tractors. In certain instances such as during maintenance (shutdowns), cleaning or other tasks the fluids may need to be drained. In order to effectively drain large, closed containers, users may be required to use pumps or other types of cumbersome equipment. This can be a laborious, inconvenient, and a costly task. Other methods for extracting liquids from large containers may require users to cut tees into large pipes and weld steel fittings to the containers, which can also be expensive and time-consuming. Individuals who work in industrial settings, farms, or who need frequent access to the contents of the tanks for their homes, may benefit from a convenient, efficient solution.

Various attempts have been made to solve the above-mentioned problems such as those found in U.S. Pat. No. 7,597, 361; Pub No. 2004/0265091; U.S. Pat. Nos. 5,439,256; 5,129, 684; 6,681,796; and 7,552,742. This prior art is representative of draining means. None of the above inventions and patents, taken either singly or in combination, is seen to describe the invention as claimed.

Ideally, an efficient drain system should be user-friendly, safe in-use and, yet would operate reliably and be manufactured at a modest expense. Thus, a need exists for a reliable efficient drain system to avoid the above-mentioned problems.

BRIEF SUMMARY OF THE INVENTION

In view of the foregoing disadvantages inherent in the known draining device art, the present invention provides a novel efficient drain system. The general purpose of the present invention, which will be described subsequently in greater detail is to provide safe, efficient draining means for contained and substantially contained fluids.

The present invention allows users to easily drain large containers, such as tanks, barrels, drums, and pipes which are used to hold liquids. This innovative product preferably features a draining pipe with an attached dispensing valve, which can be installed into a hole that is drilled into the desired container. After installation, consumers may simply turn the dispensing valve to release desired amounts of liquid/gas/semi-solid(s). Using this product may eliminate the need for using pumps, or for welding or cutting tees into pipes, in order to effectively drain large containers or piping systems. It may be ideal for use in residential homes, farms, and industrial establishments.

An efficient drain system is disclosed herein, in a preferred embodiment comprising a fluid valving assembly. The fluid valving assembly comprises a threaded valved faucet having; a handle comprising a wheel handle; a stem; a threaded spindle; a packing nut; a packing; a seat washer; and a valve seat; a threaded nut comprising an IP nut; a first and second washer, (the first washer is rigid and the second washer comprising rubber); a threaded nipple; at least two bracing members acting as retaining plates. The bracing members comprise a first bracing member; and a second bracing member. The present invention also comprises a through-fastener comprising a retainer pin;

The threaded valved faucet is operable to allow and restrict fluid-flow via the handle. The handle is coupled to said stem; the stem passing through the packing nut and the packing. The threaded spindle is able to be manipulated by the handle via the stem such that the seat washer is able to contact the valve seat in a closed condition wherein fluid is prevented from flow. When the seat washer is not in contact with the valve seat provides that the fluid is able to (free) flow through a flow opening located in the valve seat.

The packing nut and packing provide sealing to contain the fluid from escaping adjacent the stem. The threaded nut is preferably coupled between the first washer and the threaded valved faucet onto the threaded nipple such that the threaded valved faucet is able to be seal-inserted through a container-aperture in a fluid container. The second washer comprising rubber is located about the threaded nipple in series, the first washer located on an outside of the fluid container acting as a gasket and the second washer located on an inside of the fluid container in series about the threaded nipple. The first and second washers comprises surface area increasers to decrease strain (distribute fluid load) on the container-aperture in the fluid container. The container-aperture comprises about a 1⅜" hole drilled into the fluid container in preferred embodiments.

The threaded valved faucet is coupled in fluid communication with the threaded nipple, the threaded nipple accessing an inner volume located in the inside of the fluid container and the threaded valved faucet located adjacent the outside of the fluid container. The two bracing members are preferably located vertically within the fluid container acting as surface area supports. The through-fastener comprises a retainer pin in preferred embodiments which is insertable (sequentially) through a first orifice in the first bracing member, a through-hole in the threaded nipple, and a second orifice in the second bracing member; the first bracing member and the second bracing member acting as the retaining plates coupled in combination with the threaded nipple to maintain relative static positioning of the fluid valving assembly in relation to the fluid container. The fluid container may be a pipe and may comprise other containment means such as barrels, tanks and the like in closed and/or open systems.

The threaded valved faucet of the fluid valving assembly comprises outer threads such that a hose may be coupled thereto to remotely drain the fluid; wherein the fluid is a flowable liquid. The hose may comprise rigid piping if desired. The threaded valved faucet is horizontally installable in the fluid container through the container-aperture, the container-aperture located a distance from a bottom of the fluid container such that sediment located in the fluid container doesn't enter and obstruct (plug off) the threaded nipple. The threaded valved faucet is removably inter-changeable if desired. In this way the fluid valving assembly, as coupled to the fluid container, is able to be manipulated by an operator to drain the fluid located in the fluid container in a controlled fashion.

A method of use for an efficient drain system is also disclosed herein comprising the steps of: installing a fluid valving assembly through a container-aperture into a fluid container; sealing the fluid valving assembly to the fluid container; filling at least one fluid into the fluid container; and controllably-draining a desired amount of the at least one fluid using the fluid valving assembly during a maintenance period, the fluid valving assembly in an open condition; wherein the fluid container when closed is able to maintain a closed system thereby preventing a need for disassembly. Other installations may be used.

The present invention holds significant improvements and serves as an efficient drain system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, efficient drain systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a drain valve device and more particularly to an efficient drain system as used to improve the safety and efficiency of draining fluids from contained tanks, pipes and the like.

Generally speaking, the present invention is designed to facilitate the draining of large open and closed containers used to hold liquids and other fluids. The invention may comprise a threaded pipe that can be inserted into an approximately 1⅜" hole drilled into the desired container. It may be secured into place with retaining plates and a retaining pin, which can be placed through the plates and the pipe. A rubber washer, followed by a plate washer can then be applied to the exposed portion of the pipe, and may be secured into place in front of the container. An IP nut may be threaded onto the pipe, followed by any desired dispensing valve. Once installed, the valve can be used to dispense liquid as desired. This system may be used on both open and closed containers of virtually any sizes, including rain barrels and water tanks. The present invention may also be used in large pipes in domestic and industrial applications to drain such pipes without having to shut down systems, cut into the pipe or other such repairs. In these instances the present invention is located in the bottom or side of the pipe for easy access to drain the pipe as desired.

Figure 1:
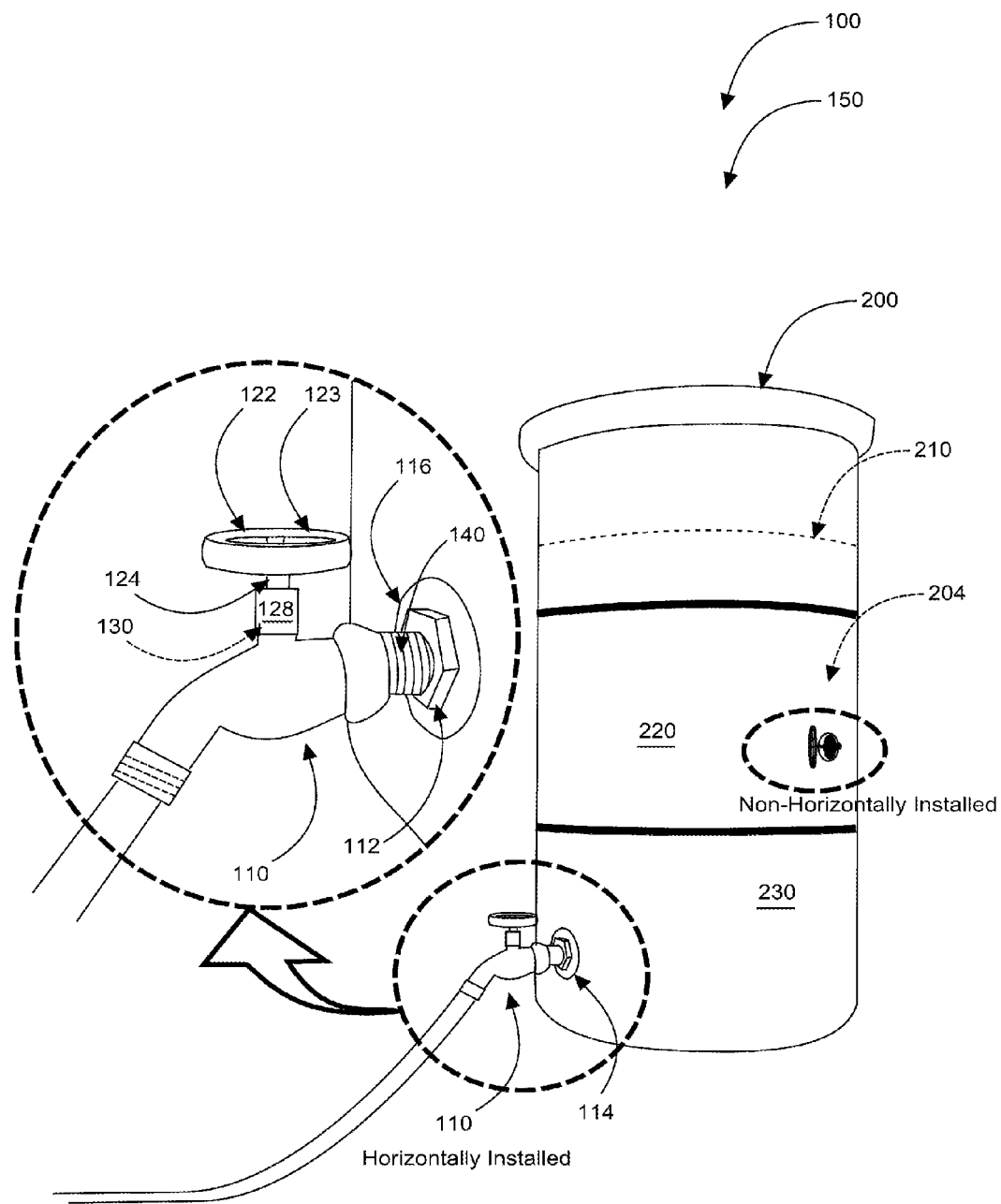
FIG. 1 shows a perspective view illustrating a fluid valving assembly of the efficient drain system in an in-use condition as coupled to a container containing fluid according to an embodiment of the present invention.

Referring to the drawings by numerals of reference there is shown in FIG. 1 showing a perspective view illustrating fluid valving assembly 110 of efficient drain system 100 in an in-use condition 150 as coupled to container 200 containing fluid 210 according to an embodiment of the present invention.

An efficient drain system 100 as disclosed herein may comprise fluid valving assembly 110. Fluid valving assembly 110 preferably comprises threaded valved faucet 120 (non-threaded versions may be used in alternate embodiments and be soldered or the like, but threaded is preferable for ease of laymen use/installation/de-installation and further since no heat or flame is required which may be dangerous if fluid(s) 210 comprise flammable liquids/gases). Threaded valved faucet 120 preferably has: handle 122; stem 124; threaded spindle 126; packing nut 128; packing 130; seat washer 132; and valve seat 134.

Fluid valving assembly 110 preferably also comprises threaded nut 112; at least two washers 114 (denoted first washer 116 and second washer 118, respectively); a threaded nipple 140; at least two bracing members 160 (comprising first bracing member 162; and second bracing member 164); and through-fastener 170. Those with ordinary skill in the art will now appreciate that upon reading this specification and by their understanding the art of faucets and taps as described herein, methods and different versions may be used and their relevant equivalence and interchangeability will be understood by those knowledgeable in such art. For example different valves may be used, different style taps, differently shaped handles, manual versions, automatic, and the like. These and other readily envisioned equivalents are to be considered within the scope of the present invention.

Threaded valved faucet 120 is operable via handle 122; handle 122 is coupled (integral with) to stem 124, stem 124 passing through packing nut 128 and packing 130. Threaded spindle 126 able to be manipulated by handle 122 via stem 124 such that seat washer 132 is able to contact valve seat 134 in a closed condition whereby fluid is prevented from flow. When seat washer 132 is not in contact with valve seat 134 fluid 210 is able to flow through flow opening 136 located in (through) valve seat 134. Packing nut 128 and packing 130 provide sealing (sealing means) to suitably and effectively contain fluid 210 from escaping adjacent stem 124. Packing 130 may be replaceable in certain embodiments.

Threaded nut 112 is preferably coupled between first washer 116 and threaded valved faucet 120 onto threaded nipple 140 such that threaded valved faucet 120 is able to be seal-inserted through container-aperture 202 in a fluid container 200. Second washer 118 is located about threaded nipple 140 in series (shown in FIG. 4 exploded view); first washer 116 located on an outside of fluid container 200 and said second washer 118 located on an inside of fluid container 200 in series about threaded nipple 140. First washer 116 and second washer 118 both comprises surface area increasers such that force from the weight of fluid 210 is suitably displaced.

Threaded valved faucet 120 is preferably coupled in fluid communication with threaded nipple 140, threaded nipple 140 accessing inside (inner volume 204) of fluid container 200 and threaded valved faucet 120 located adjacent outside of fluid container 200. Preferably two bracing members 160 are located vertically within fluid container 200 acting as a surface area supports. Through-fastener 170 is inserted through first orifice 163 in first bracing member 162, a through-hole 142 in threaded nipple 140, and second orifice 165 in second bracing member 164, respectively; first bracing member 162 and second bracing member 164 coupled in combination with threaded nipple 140 to maintain fluid valving assembly 110 to fluid container 200.

Figure 2:
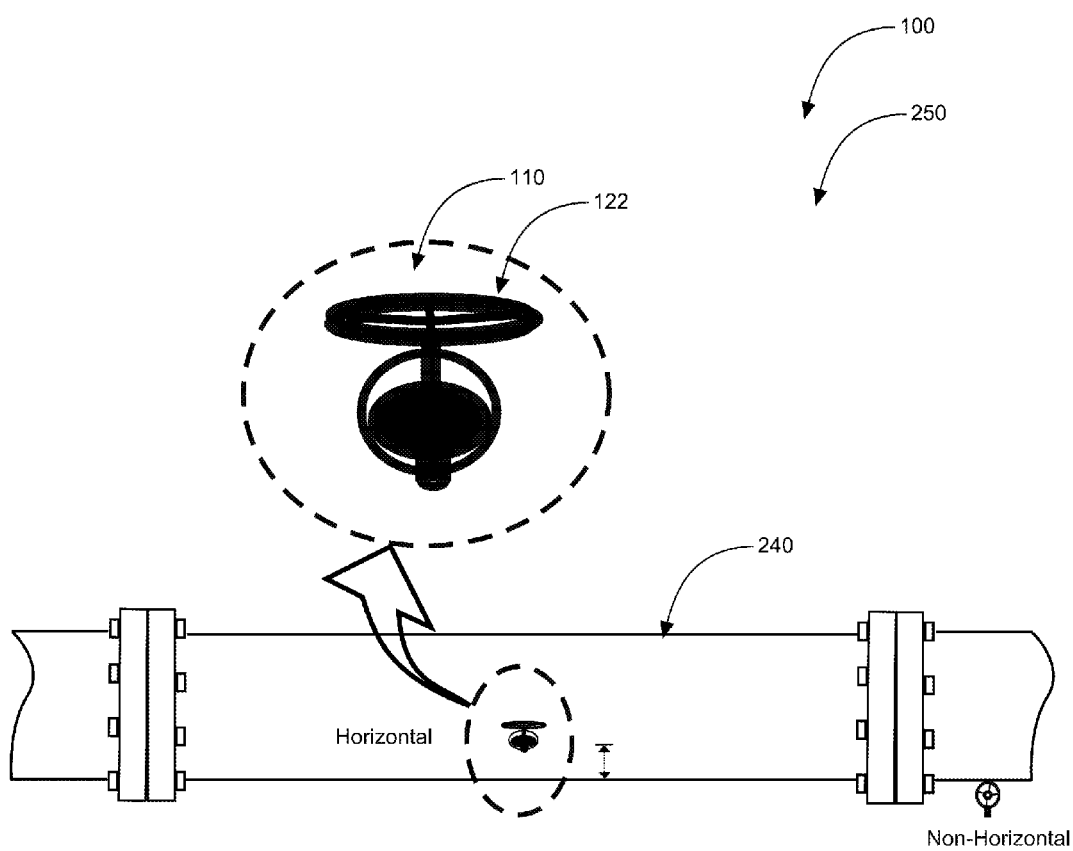
FIG. 2 is a perspective view illustrating the fluid valving assembly of the efficient drain system in another in-use condition as coupled to a pipe containing fluid according to an embodiment of the present invention of FIG. 1.

Fluid valving assembly 110, as coupled to fluid container 200, is able to be manipulated by an operator to drain fluid 210 located in fluid container 200 in a controlled fashion (opening and closing as desired). Threaded valved faucet 120 of fluid valving assembly 110 may comprises outer (or inner) threads such that a hose (or rigid piping) may be coupled thereto to remotely drain (or detour) fluid 210. Fluid container 200 is a barrel 220 in certain embodiments, as shown. Fluid container may also comprise a tank 230 or pipe 240, as shown in FIG. 2. Container-aperture 202 comprises about a 1⅜" hole drilled (or otherwise manufactured) into fluid container 200.

Referring now to FIG. 2 a perspective view illustrating fluid valving assembly 110 of efficient drain system 100 in another in-use condition 250 as coupled to pipe 240 containing fluid 210 according to an embodiment of the present invention of FIG. 1.

Fluid container 200 comprises pipe 240 in the present figure; however other various application can be envisioned within the scope of the present invention. Container-aperture 202 preferably comprises about a 1⅜" hole drilled into fluid container 200, but may be larger or smaller depending on the application and relative size of fluid container 200 and threaded valved faucet 120. This sizing may also depend on the viscosity of fluid 210. Handle 122 comprises wheel handle 123 in preferred embodiments, as shown for accurate incremental movement. Handle 122 may comprise a non-wheel handle in other embodiments such as T-handles or the like.

Threaded valved faucet 120 is horizontally installable in fluid container 200, as shown. Threaded valved faucet 120 is installed in (through) container-aperture 202; container-aperture 202 preferably located a distance from a bottom of fluid container 200 (as indicated by arrowed line) such that sediment located in fluid container 200 doesn't enter and obstruct threaded nipple 140. Threaded valved faucet 120 is non-horizontally installable in fluid container 200 in certain applications. Fluid 210 may include a liquid, solid or gas. When fluid 210 is a liquid it may comprise particulate solids such that it is a semi-solid. Many different types of fluid 210 may be dispensed (evacuated) using the present invention.

Figure 3:
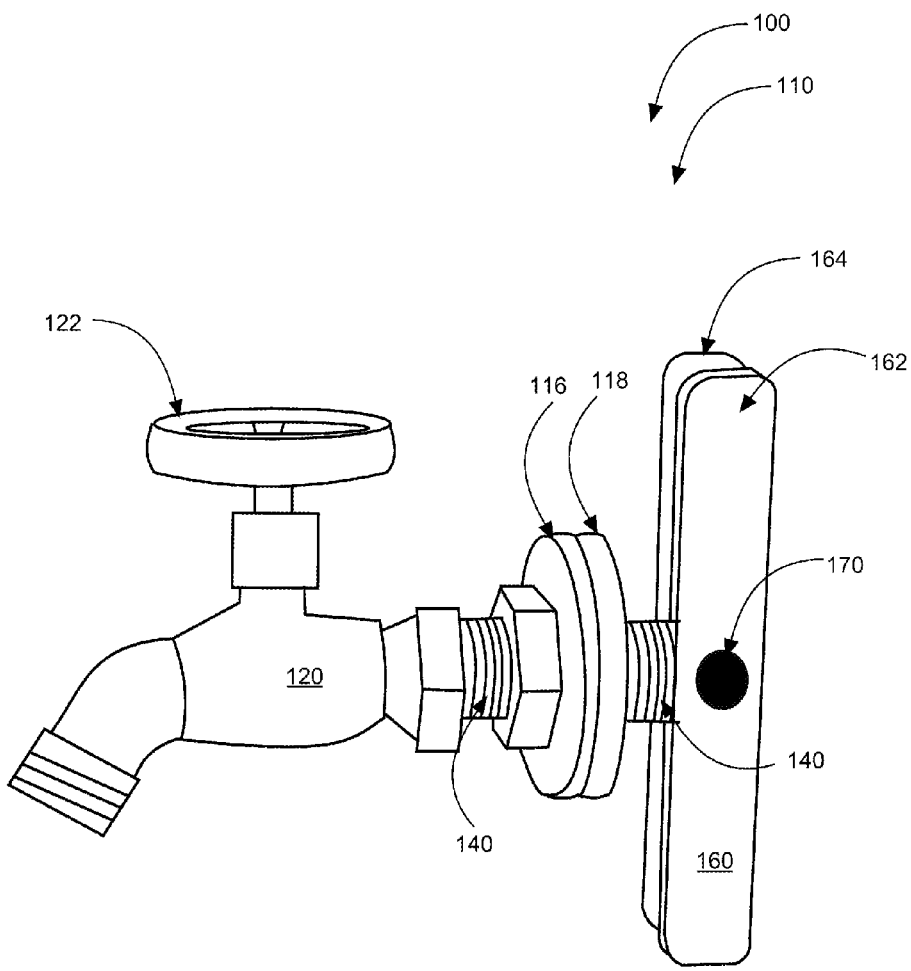
FIG. 3 is a perspective view illustrating the fluid valving assembly according to an embodiment of the present invention of FIG. 1.
Figure 4:
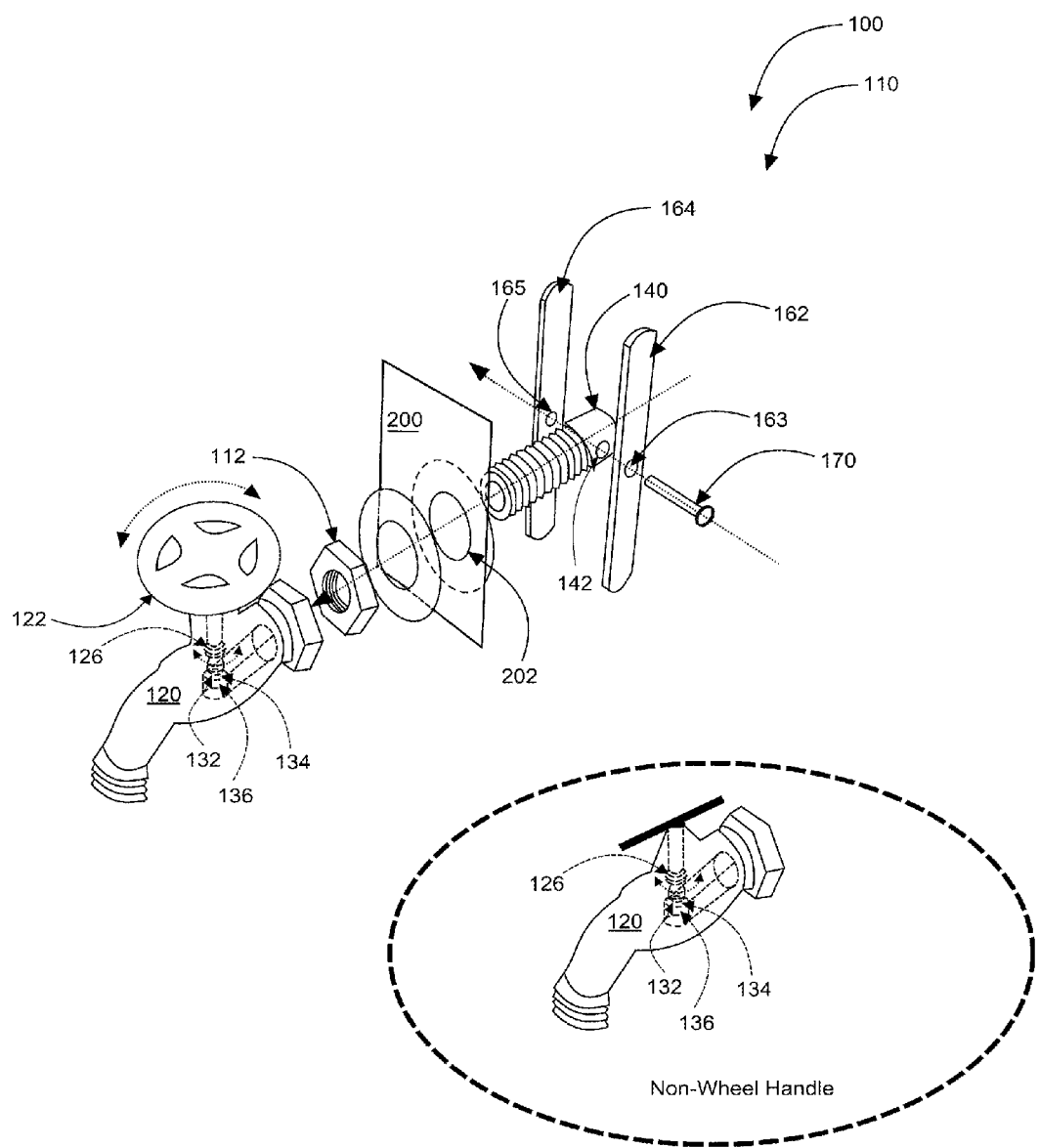
FIG. 4 is an exploded view illustrating the fluid valving assembly according to an embodiment of the present invention of FIG. 1.

Referring now to FIGS. 3 and 4 both perspective views illustrating fluid valving assembly 110, FIG. 4 in particular showing an exploded view illustrating fluid valving assembly 110 according to an embodiment of the present invention of FIG. 1.

Threaded valved faucet 120 is preferably removably interchangeable via threading and unthreading the device thereto and therefrom. Other fitting arrangements may also be used such as quick-coupling and the like. The exploded view (FIG. 4) is shown to show the relationship between the various components to enable installation (in series as mentioned previously and) as discussed in FIG. 5. Through-fastener 170 may comprise a retainer pin or other suitable fastener means. First bracing member 162 and second bracing member 164 comprise retaining plates. Second washer comprises rubber 118 (and is located inside fluid container 200 to prevent fluid 210 from seeping or otherwise escaping confines of fluid container 200, unless purposefully egressed through threaded valved faucet 120. A gasket or rubber washer may also be used on the outside as a redundant means to prevent leakage. Threaded nut 112 comprises an IP nut in preferred embodiments. A barbed version may be available for emergency use wherein a hole may be drilled or punched in fluid container 200 (such as pipe 240) wherein spring-loaded arms may proceed (expand) outwardly once inside inner volume 204 of fluid container 200, working in a similar manner to fasteners used into drywall for hanging pictures therefrom. The present invention may be used for fluids 210 contained at ambient or at pressurized conditions; in pressurized conditions increased sealing means may be required.

Efficient drain system 100 may be sold as kit 440 comprising the following parts: at least one fluid valving assembly 110 including threaded valved faucet 120; at least one threaded nipple 140; bracing members 160; various fasteners (nuts and the like); at least one through-fastener 170; and at least one set of user installation instructions. Efficient drain system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different gasket combinations, parts may be sold separately, etc., may be sufficient.

Figure 5:
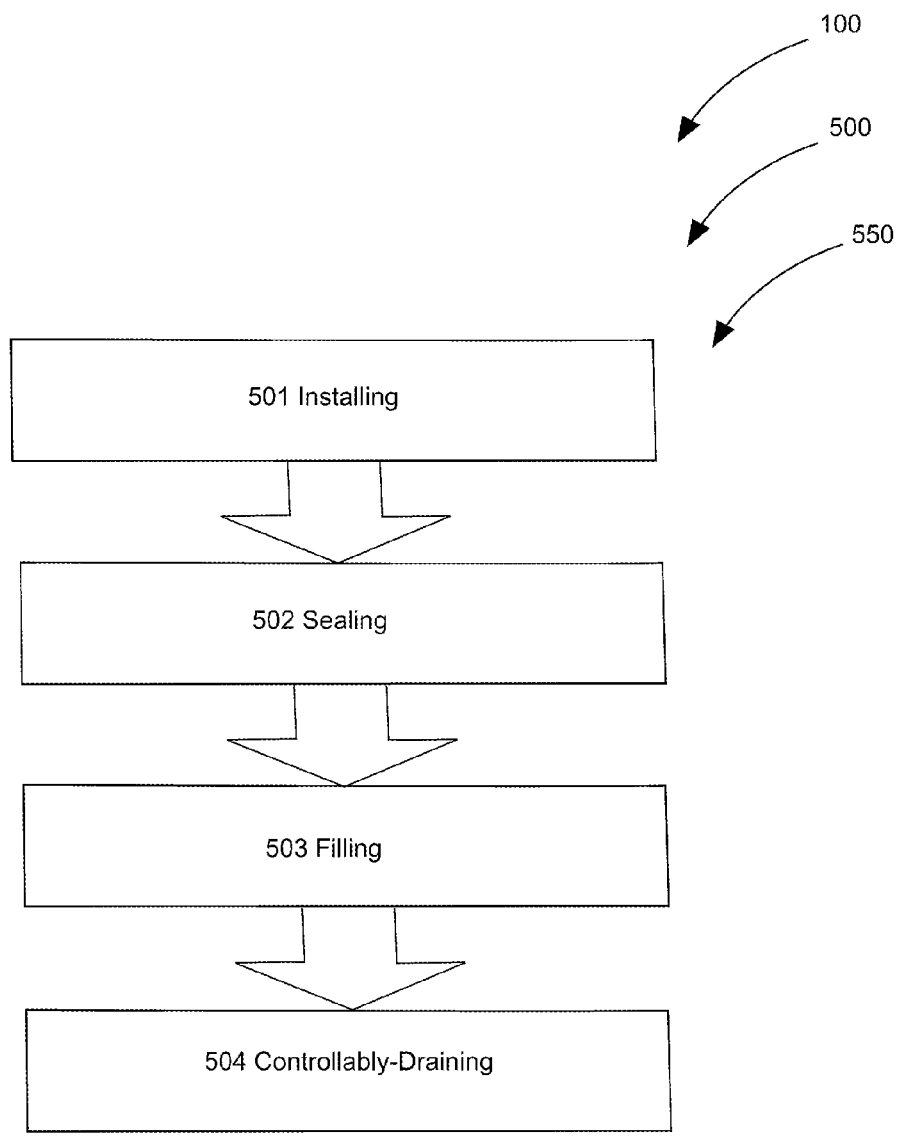
FIG. 5 is a flowchart illustrating a method of use for the fluid valving assembly of the efficient drain system according to an embodiment of the present invention of FIGS. 1-4.

Referring now to Referring now to FIG. 5 a flowchart 550 illustrating a method of use 500 for fluid valving assembly 110 of efficient drain system 100 according to an embodiment of the present invention of FIGS. 1-4.

A method of use 500 for efficient drain system 100 comprises the steps of: step one 501 installing fluid valving assembly 110 through container-aperture 202 into fluid container 200; step two 502 sealing fluid valving assembly 110 to fluid container 200; step three 503 filling at least one fluid 210 into fluid container 200; and step four 504 controllably-draining a desired amount of at least one fluid 210 using fluid valving assembly 110 during a maintenance period, (fluid valving assembly 110 in an open condition); wherein fluid container 200 (when closed) is able to maintain a closed system thereby preventing a need for disassembly. Using the present invention in this manner may prove cost-effective for shut-downs and the like to minimize maintenance time, repair time and materials to minimize downtime.

It should be noted that the steps described in the method of use can be carried out in many different orders according to user preference. The use of "step of" should not be interpreted as "step for", in the claims herein and is not intended to invoke the provisions of 35 U.S.C. §112, §6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An efficient drain system comprising:
    a fluid valving assembly comprising;
        a threaded valved faucet having;
            a handle;
            a stem;
            a threaded spindle;
            a packing nut;
            a packing;
            a seat washer; and
            a valve seat;
        a threaded nut;
        at least two washers comprising a first washer and a second washer;
        a threaded nipple;
        at least two bracing members comprising;
            a first bracing member; and
            a second bracing member; and
        a through-fastener;
    wherein said threaded valved faucet is operatable via said handle, said handle is coupled to said stem, said stem passing through said packing nut and said packing, said threaded spindle able to be manipulated by said handle via said stem such that said seat washer is able to contact said valve seat in a closed condition wherein fluid is prevented from flow;
    wherein when said seat washer is not in contact with said valve seat provides that said fluid is able to flow through a flow opening located in said valve seat;
    wherein said packing nut and said packing provide sealing to contain said fluid from escaping adjacent said stem;
    wherein said threaded nut is coupled between said first washer and said threaded valved faucet onto said threaded nipple such that said threaded valved faucet is able to be seal-inserted through an container-aperture in a fluid container and said second washer located about said threaded nipple in series, said first washer located on an outside of said fluid container and said second washer located on an inside of said fluid container in series about said threaded nipple;
    wherein said first washer and second washer comprises surface area increasers;
    wherein said threaded valved faucet is coupled in fluid communication with said threaded nipple, said threaded nipple accessing said inside of said fluid container and said threaded valved faucet located adjacent said outside of said fluid container;
    wherein said at least two bracing members are located vertically within said fluid container acting as a surface area supports;
    wherein said through-fastener is inserted through a first orifice in said first bracing member, a through-hole in said threaded nipple, and a second orifice in said second bracing member, said first bracing member and said second bracing member coupled in combination with said threaded nipple to maintain said fluid valving assembly to said fluid container; and
    wherein said fluid valving assembly as coupled to said fluid container is able to be manipulated by an operator to drain said fluid located in said fluid container in a controlled fashion.

2. The efficient drain system of claim 1 wherein said fluid container is a pipe.

3. The efficient drain system of claim 1 wherein said fluid container is a barrel.

4. The efficient drain system of claim 3 wherein said fluid container is a tank.

5. The efficient drain system of claim 4 wherein said threaded valved faucet of said fluid valving assembly comprises outer threads such that a hose may be coupled thereto to remotely drain said fluid.

6. The efficient drain system of claim 5 wherein said through-fastener comprises a retainer pin.

7. The efficient drain system of claim 6 wherein said first bracing member and said second bracing member comprise retaining plates.

8. The efficient drain system of claim 7 wherein said second washer comprises rubber.

9. The efficient drain system of claim 8 wherein said threaded valved faucet is removably inter-changeable.

10. The efficient drain system of claim 9 wherein said threaded nut comprises an IP nut.

11. The efficient drain system of claim 10 wherein said container-aperture comprises about a 1⅜" hole drilled into said fluid container.

12. The efficient drain system of claim 11 wherein said handle comprises a wheel handle.

13. The efficient drain system of claim 12 wherein said threaded valved faucet is horizontally installable in said fluid container.

14. The efficient drain system of claim 13 wherein said threaded valved faucet is installed in said container-aperture, said container-aperture located a distance from a bottom of said fluid container such that sediment located in said fluid container doesn't enter and obstruct said threaded nipple.

15. The efficient drain system of claim 14 wherein said fluid is a liquid.

16. The efficient drain system of claim 14 wherein said fluid is a liquid comprising particulate solids.

17. The efficient drain system of claim 12 wherein said threaded valved faucet is non-horizontally installable in said fluid container.

18. The efficient drain system of claim 11 wherein said handle comprises a non-wheel handle.

19. An efficient drain system comprising:
a fluid valving assembly comprising;
a threaded valved faucet having;
a handle comprising a wheel handle;
a stem;
a threaded spindle;
a packing nut;
a packing;
a seat washer; and
a valve seat;
a threaded nut comprising an IP nut;
a first washer and a second washer, said first washer is rigid and said second washer comprises rubber;
a threaded nipple;
at least two bracing members acting as retaining plates, said bracing members comprising;
a first bracing member; and
a second bracing member; and
a through-fastener comprising a retainer pin;
wherein said threaded valved faucet is operatable to allow and restrict fluid-flow via said handle, said handle is coupled to said stem, said stem passing through said packing nut and said packing, said threaded spindle able to be manipulated by said handle via said stem such that said seat washer is able to contact said valve seat in a closed condition wherein fluid is prevented from flow;
wherein when said seat washer is not in contact with said valve seat provides that said fluid is able to flow through a flow opening located in said valve seat;
wherein said packing nut and said packing provide sealing to contain said fluid from escaping adjacent said stem;
wherein said threaded nut is coupled between said first washer and said threaded valved faucet onto said threaded nipple such that said threaded valved faucet is able to be seal-inserted through a container-aperture in a fluid container and said second washer comprising rubber is located about said threaded nipple in series, said first washer located on an outside of said fluid container and said second washer located on an inside of said fluid container acting as a gasket in series about said threaded nipple;
wherein said first washer and said second washer comprises surface area increasers to decrease strain on said container-aperture in said fluid container;
wherein said container-aperture comprises about a 1⅜" hole drilled into said fluid container;
wherein said threaded valved faucet is coupled in fluid communication with said threaded nipple, said threaded nipple accessing an inner volume located in said inside of said fluid container and said threaded valved faucet located adjacent said outside of said fluid container;
wherein said at least two bracing members are located vertically within said fluid container acting as surface area supports;
wherein said through-fastener comprises a retainer pin which is insertable through a first orifice in said first bracing member, a through-hole in said threaded nipple, and a second orifice in said second bracing member, sequentially, said first bracing member and said second bracing member acting as said retaining plates coupled in combination with said threaded nipple to maintain relative static positioning of said fluid valving assembly in relation to said fluid container;
wherein said fluid container is a pipe;
wherein said threaded valved faucet of said fluid valving assembly comprises outer threads such that a hose may be coupled thereto to remotely drain said fluid;
wherein said fluid is a flowable liquid;
wherein said threaded valved faucet is horizontally installable in said fluid container through said container-aperture, said container-aperture located a distance from a bottom of said fluid container such that sediment located in said fluid container doesn't enter and obstruct said threaded nipple;
wherein said threaded valved faucet is removably interchangeable; and
wherein said fluid valving assembly as coupled to said fluid container is able to be manipulated by an operator to drain said fluid located in said fluid container in a controlled fashion.

* * * * *